J. S. BENSON.
PROPELLER WHEEL.
APPLICATION FILED SEPT. 13, 1909.
981,835.
Patented Jan. 17, 1911.
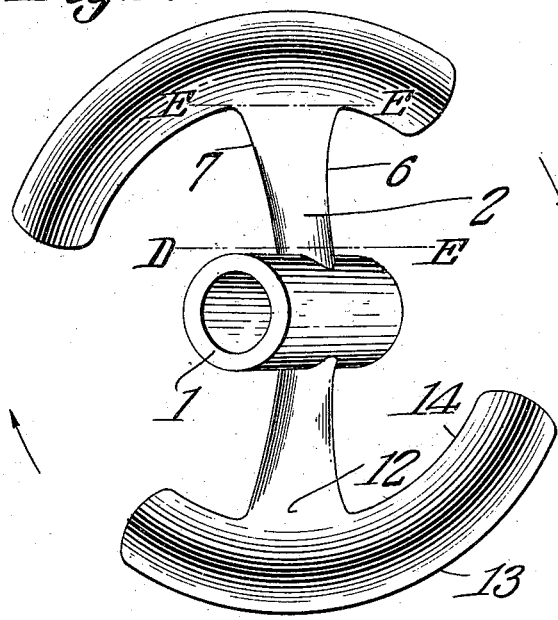
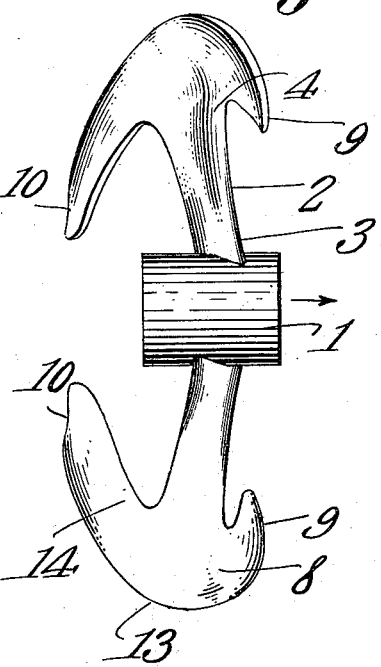
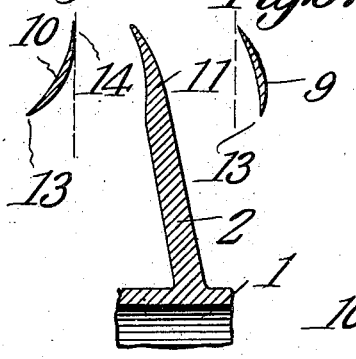
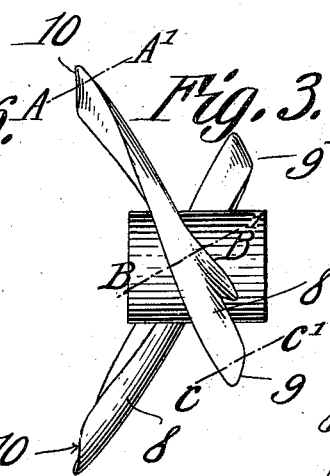
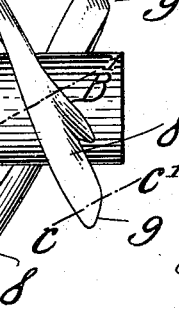
Witnesses
Francis Boyle
Inventor
Joseph S. Benson.
By C. A. Snow & Co.
Attorneys

UNITED STATES PATENT OFFICE.

JOSEPH S. BENSON, OF IOWA CITY, IOWA.

PROPELLER-WHEEL.

981,835.

Specification of Letters Patent. Patented Jan. 17, 1911.

Application filed September 13, 1909. Serial No. 517,384.

*To all whom it may concern:*

Be it known that I, JOSEPH S. BENSON, a citizen of the United States, residing at Iowa City, in the county of Johnson and State of Iowa, have invented a new and useful Propeller-Wheel, of which the following is a specification.

My invention relates to propellers and has for an object to obviate as much as possible the "drag" resulting from negative pressure exerted by the water upon the leading portions of the propeller blades which experiment and calculation has shown to be very considerable and also doubly wasteful in that it wastes not only the power required to produce it, but also sufficient power to produce an amount of thrust equal to counteracting its detrimental effect. For this purpose the forward or leading portion of each blade is terminated adjacent the leading edge of the arm while the following portion is elongated and curved downward so as to terminate farther from the hub than the leading edge whereby the water escaping from the leading portion of the blade due to the centrifugal force developed when the wheel is rotated is caught and utilized to force forward the boat.

It has been demonstrated by experiment that the blades of large propeller wheels as usually fitted, reach out into comparatively undisturbed water while small propeller wheels have a tendency to race due to the occasional failure of the water to flow in behind the buttock lines. It has been further determined by calculation that the surface frictional resistance commonly known as "skin" friction varies per square foot of area space directly as the distance from the center of the hub so that any increase in diameter means large increase in the amount of power absorbed in overcoming this friction.

My present invention spaces the blades well out from the hub so that they will reach out into comparatively undisturbed water, the spacing arms being inclined toward the rear end face of the hub and arranged non-radial on the hub so as to utilize the water currents intermediate the blades and the hub instead of simply churning the water as in propellers of this character previously constructed.

The invention further provides a propeller of considerable diameter but with the greatest area so positioned relatively with the hub as to counter-balance the mischievous effect of the "skin" friction.

With the above advantages and other objects in view which will appear as the nature of my invention is better understood, my invention embraces the novel details of construction and combination of parts illustrated in the accompanying drawings, shown in the following specification, and set forth in the appended claims.

In the accompanying drawing,—Figure 1 is a perspective view of my improved propeller wheel with the blades shown in side elevation. Fig. 2 is a side elevation of the propeller. Fig. 3 is a plan view of the same. Figs. 4, 5 and 6 are vertical sections, taken on the lines A—A', B—B', C—C', respectively of Fig. 3. Fig. 7 is an enlarged transverse section of an arm taken on the line D—D of Fig. 1. Fig. 8 is a similar view, taken on the line E—E of Fig. 1. Fig. 9 is a fragmentary view in end elevation of a propeller blade.

Like characters of reference designate similar parts in the views shown.

Referring now to the drawing, a propeller wheel is shown having a hub 1 adapted to be secured to any desirable construction of propeller shaft applicable for the particular style of boat or vessel to which my propeller is applied. Projecting outwardly from the hub are arms 2 disposed in a plane intersecting at an angle of about 30 degrees to the longitudinal diameter of the hub and each formed with a twist which rolls from the root 3 to the extremity 4 of the arm, the curves of the twist at the root 3 being coarser, that is to say, of greater radius than the curves at the extremity 4, which feature is best shown in Figs. 7 and 8. The strength of the arm at the root varies directly as the breadth of the arm thereat, so that, by forming the root of the arm with a twist, a greater length of root and therefore a greater hold on the hub is obtainable than with the approximately straight or untwisted arm employed in similar propellers as now constructed.

The arms are thickened at their intermediate portions 5, thence taper to the leading edge 6 and following edge 7, the particular advantage of this structure being to decrease the dead weight of the propeller and, therefore, a corresponding amount of power absorbed in overcoming the friction on the shaft bearings and also to expose a curved surface from the leading edge to where the arm is thickest so that not only will there be a less negative pressure on the leading portions of the arm than usual, but also what negative pressure there may be will be exerted at a less detrimental angle than in a similarly arranged blade of uniform thickness. Each arm projects non-radially from the hub in order to position its fluke or blade 8 in a peculiar relation to the hub 1, hereinafter described. Each arm is inclined toward the rear of the hub, as clearly shown in Figs. 2 and 5. This construction permits of the extremities or driving portions of the arms being spaced a greater horizontal distance from the stern of the boat than the roots of the arms. The driving portions of the blades thus engage the water flowing rearwardly from the buttock lines of the boat a second later than would blades standing perpendicular to the hub and minimize the tendency of the propeller to race, due to the occasional failure of the water to flow in close behind the buttock lines of the boat.

Positioned at the extremities of the arms are propeller blades 8, each of which is arcuate in contour and of uniform width from the leading edge 9 to the following edge 10. Each blade is connected to its arm at a point forward of the median vertical diameter in order that the leading edge 9 of the blade will terminate adjacent the leading edge 6 of the arm 2. In practice it is found that when a screw propeller is of sufficient diameter and of ample area, any addition to the leading edge of the blade will act as a drag and seriously reduce the efficiency of the blade. By terminating the leading edge of the blade adjacent the leading edge of the arm, as above described, the disadvantage of the drag found in the centrally mounted propeller blades is entirely obviated. By this novel manner of mounting the blades, namely, connecting each arc shaped blade at a point adjacent its leading edge to the extremities of the inclined arms, the following edge 10 of each blade is spaced a considerably greater distance from the longitudinal center of the hub than the leading edge 9. This feature is best shown in Fig. 9. The particular advantage in the following edge being spaced farther from the hub than the leading edge is that as the blade is rotated in the direction of the arrow heads, the water thrown upward from the leading portions of the blade by centrifugal force will be caught by the following portions of the blade and utilized in further propelling the boat forward instead of being dissipated as in the usual form of centrally mounted propeller blades.

Each propeller blade is bent or rolled from its intermediate portion 11 toward the following edge and also bent or rolled forwardly therefrom toward the leading edge, so that the following edge 10 is inclined at an opposite angle to a plane passed through the longitudinal diameter of the blade, than the leading edge 9 to the same plane. This may be seen by reference to Figs. 4 and 6 in which the dotted line represents a plane passing through the longitudinal diameter of the blade, perpendicular to the axis of the hub. This construction produces a curved channel longitudinally of the blade which permits of an easy passage of the water toward the rear of the blade but causing the same at every point in its passage to be accelerated and to force forward the boat to a much greater extent than would be possible in a flat blade from which the water escapes from the extremities of the blade without imparting its full latent driving capacity thereto.

Each blade is disposed diagonally the hub, as may be seen by referring to Fig. 3 and at a different angle to the longitudinal diameter of the hub than its corresponding arm, the preferable relation of the parts being to dispose the arm at an angle of approximately 30 degrees from the longitudinal diameter of the hub and the blade at approximately an angle of 60 degrees from said diameter as shown in Fig. 3. Each arm is preferably widened at its upper end, as shown at 12, so that the great length of the joint between the blade and arm will give a sufficient rigidity to the blade to prevent an abnormal amount of vibration of the parts when the wheel is rotated. The arms being widest at the portion remote from the hub serve to impart a considerable driving capacity to the arms as the flared ends will be extended out into the comparatively undisturbed water while the portion nearest the hub which in the ordinary propeller simply churns the water, is thickened and contracted in breadth whereby the "skin" friction is reduced and the root portion of the arms utilized simply in giving additional strength and stability to the blades.

It will be noted that the thickness of the blade is greatest at its intermediate portion and tapers uniformly to the lateral extremities 13 and 14 and to the leading and following edges of the blade. The advantage of this construction is that the negative pressure exerted by the streams or currents of water upon the leading portions of the blade will be directed from the curved outer surface of the blade with a less appreciable mischievous effect than in a blade of uniform thickness.

From the foregoing description, taken in connection with the accompanying drawings, it is thought that the construction and operation of my invention will be easily understood without a more extended explanation, it being understood that various changes in the form, proportion and minor details of construction may be made without sacrificing any of the advantages or departing from the spirit of the invention.

What is claimed is:—

1. In a propeller wheel, a hub, arms projecting from the hub, said arms being set obliquely to the longitudinal diameter of the hub and being inclined toward the rear end face of the hub, and blades secured across the extremities of the arms, the leading edges of the blades being spaced a less distance from the hub than their following edges.

2. In a propeller wheel, a hub, non-radial arms projecting from the hub, said arms being inclined toward the rear end face of the hub, and curved blades secured across the extremities of the arms, the leading edges of the blades being spaced a less distance from the hub than their following edges.

3. In a propeller wheel, a hub, non-radial arms projecting from the hub, said arms being set obliquely to the longitudinal diameter of the hub and being inclined toward the rear end face of the hub, and arcuate blades secured across the extremities of the arms, the leading edges of the blades being spaced a less distance from the hub than their following edges.

4. In a propeller wheel, a hub, arms projecting from said hub, said arms inclining toward the rear end face of the hub, and arcuate blades secured adjacent their leading edges to the extremities of said arms, said blades being of uniform width and tapering in thickness from the center to each lateral edge and from the center to the leading edge and to following edge, said blades having a longitudinal twist adapted to permit an easy passage of the water toward the rear of the blade.

5. In a propeller wheel, a hub, arms projecting from said hub, said arms inclining toward the rear flat end of the hub and having a longitudinal twist rolling from end to end of the arm, and arcuate blades secured adjacent one end to the extremities of said arms.

6. In a propeller wheel, a hub, non-radial arms inclining rearwardly from said hub, each of said arms having a longitudinal twist rolling from the root to the extremity of the arm, said arms being thickest at their intermediate portions and gradually tapering from thence to their leading and following portions, and arcuate blades secured to the extremities of said arms and having their leading edges spaced a less distance from said hub than their following edges.

7. In a propeller wheel, a hub, non-radial arms projecting rearwardly from said hub, said arms being flared from their roots to their extremities and having a longitudinal twist rolling from their roots to their extremities, and propeller blades secured adjacent their leading edges to the flared extremities of said arms, said propeller blades having their following edges oppositely inclined to their leading edges and the intermediate portions thickened and gradually tapering from lateral edge to lateral edge and from leading edge to the following edge.

8. In a propeller wheel, a hub, non-radial arms rigidly secured to said hub, said arms being set diagonal to the longitudinal diameter of said hub and sloping toward the rear end face of the hub, said arms each having a longitudinal twist greater in pitch at the secured end and gradually decreasing from thence to the free end, and curved propeller blades secured at one end to said arms, said propeller blades being disposed at a lesser angle in relation to the longitudinal diameter of said hub than said arms.

9. In a propeller wheel, a hub, non-radial arms projecting rearwardly from said hub, said arms being flared from their secured ends to their free ends, said arms each having a longitudinal twist gradually decreasing in pitch from their secured ends to their free ends, curved propeller blades rigidly secured to the flared extremities of said arms and rolled forwardly from the secured portion and backward therefrom so as to present the leading edges and following edges at opposite angles to the plane of said arms, said propeller blades having their following edges spaced a greater distance from said hub than the leading edges.

In testimony that I claim the foregoing as my own, I have hereto affixed my signature in the presence of two witnesses.

JOSEPH S. BENSON.

Witnesses:
P. A. KORAH,
W. J. WEEBER.